(12) United States Patent
Nieminen

(10) Patent No.: US 7,052,771 B2
(45) Date of Patent: May 30, 2006

(54) ELECTRICALLY CONDUCTIVE COVERING MATERIAL

(75) Inventor: Jyri Nieminen, Tampere (FI)

(73) Assignee: IonPhasE Oy, Tampere (FI)

( * ) Notice: Subject to any disclaimer, the term of this patent is extended or adjusted under 35 U.S.C. 154(b) by 103 days.

(21) Appl. No.: 10/479,219

(22) PCT Filed: Nov. 1, 2002

(86) PCT No.: PCT/FI02/00852

§ 371 (c)(1), (2), (4) Date: Apr. 12, 2004

(87) PCT Pub. No.: WO03/037622

PCT Pub. Date: May 8, 2003

(65) Prior Publication Data

US 2004/0166347 A1 Aug. 26, 2004

(30) Foreign Application Priority Data

| Nov. 1, 2001 | (FI) | ................... | 20012109 |
| Nov. 1, 2001 | (FI) | ................... | 20012110 |
| Nov. 1, 2001 | (FI) | ................... | 20012111 |

(51) Int. Cl.
*B32B 15/08* (2006.01)

(52) U.S. Cl. .................. 428/457; 428/458; 428/461; 428/462

(58) Field of Classification Search .............. None
See application file for complete search history.

(56) References Cited

U.S. PATENT DOCUMENTS

| 4,083,824 A | * | 4/1978 | Harris | ..................... 524/425 |
| 5,059,474 A | | 10/1991 | Yoshida | |
| 5,110,669 A | * | 5/1992 | Knobel et al. | .............. 428/215 |
| 5,307,233 A | | 4/1994 | Forry | |
| 5,516,546 A | | 5/1996 | Hari et al. | |
| 5,616,418 A | | 4/1997 | Vasselin et al. | |
| 5,631,311 A | | 5/1997 | Bergmann et al. | |
| 5,652,326 A | | 7/1997 | Ueda et al. | |
| 5,728,476 A | | 3/1998 | Harwood et al. | |
| 5,988,460 A | | 11/1999 | Brecheisen et al. | |
| 6,282,848 B1 | | 9/2001 | Schlapfer | |

FOREIGN PATENT DOCUMENTS

JP 58015554 1/1983

* cited by examiner

*Primary Examiner*—Stephen Stein
*Assistant Examiner*—Timothy M. Speer
(74) *Attorney, Agent, or Firm*—Harness, Dickey & Pierce, P.L.C.

(57) ABSTRACT

A covering material comprising a first layer, which forms the wearing layer of the structure and contains an ionomer, as well as a second layer next to the first layer. According to the invention, the first layer contains a wear-resistant and electrically conductive ionomer polyelectrolyte and the second layer is electrically conductive. The first layer comprises in particularan ionomer, which is a polymer of a co- or terpolymer of ethylene and acrylic or methacrylic acid, or any other known ionomer, and a block polyether, the polymer being ionically crosslinked with alkali and/or alkaline-earth and/or metal cations. The second layer forms the bottom layer of the structure, and it is made up of a polyolefin elastomer that has been rendered electrically conductive. The material according to the invention is suitable as covering for ESD applications.

13 Claims, No Drawings

ELECTRICALLY CONDUCTIVE COVERING MATERIAL

The present invention relates to a covering material comprising a first layer, which forms the wearing layer of the structure and contains an ionomer, as well as a second layer next to the first layer. According to the invention, the first layer contains a wear-resistant and electrically conductive ionomer polyelectrolyte and the second layer is electrically conductive. The first layer comprises in particular an ionomer, which is a polymer of a co- or terpolymer of ethylene and acrylic or methacrylic acid, or any other known ionomer, and a block polyether, the polymer being ionically crosslinked with alkali and/or alkaline-earth and/or metal cations. The second layer forms the bottom layer of the structure, and it is made up of a polyolefin elastomer that has been rendered electrically conductive.

A material such as this usually comprises a first layer which forms the wear layer of the structure and which contains an ionomer, as well a second layer next to the first layer.

By 'covering material' is meant in the present invention a structure which is at least in part made from a polymer and which can be used for covering surfaces. By means of covering, a surface can be protected mechanically and chemically, and desirable novel or improved properties can be obtained for the surface, such as the electrical conductivity of a desired level in the present context. The covering material can also be used for decorating a surface. Surfaces to be covered include floors and walls and ceilings, as well as various objects and parts, such as shelves and shelf tops, as well as desk pads and worktops.

In many applications the covering material must be electrically conductive so that accumulation of static electricity can be prevented. Likewise it is important that sparking and other drawbacks caused by static electricity can be avoided in certain areas. For example, in operating theaters in hospitals electrically conductive floor coverings are used because of readily inflammable anesthetic gases and sensitive instruments.

Polymeric covering materials can, by known techniques, be rendered electrically conductive, for example by mixing conductive particles with polymers, as is done, for example, in U.S. Pat. No. 5,516,546, wherein electrical conductivity is achieved using amorphous graphite powder or carbon fiber or a mixture of these. Several conductive particles, such as carbon black, become extracted from plastics, and their use in clean rooms is problematic. Carbon black and graphite powder have been generally used for rendering polymers electrically conductive. The compounds thus produced are black or very dark in color. In covering material applications this is a factor that strongly limits the outer appearance. It should be noted further that electrical conductivity achieved by means of conductive particles is, owing to percolation, often either too high or too low.

It is also a conventional method to add to surfacings antistatic materials, which typically absorb moisture from the air, and thus form slight electrical conductivity. Antistatic materials gradually migrate to the product surface, wherefrom they tend to be rinsed off in connection with, for example, washing. Consequently, the conductivity of the covering changes as the concentration of the antistatic material decreases. Electrical conductivity produced by means of antistatic materials varies strongly according to air humidity. This is an especially adverse property, since in winter, when air humidity is low, the coverings do not conduct electricity sufficiently. The optimal ESD shielding range in terms of electrical conductivity is a surface resistivity range of $10^6$–$10^9$ ohm. This range is difficult to achieve by means of antistatic compounds.

Various covering materials have also been described in the patent literature. Thus, U.S. Pat. No. 6,282,848 discloses a floor and wall surfacing material which is intended for a magnetically isolated room and which is a combination of an electrically conductive and an electrically non-conductive material which have been placed in layers and in which the conductive layer is nickel.

From U.S. Pat. No. 5,988,460 there is known an electrically conductive surfacing wherein ferrosilicate particles are dispersed as particles of approx. 20 μm in a polymer resin.

U.S. Pat. No. 5,631,311 relates to a transparent material discharging static electricity, wherein the electrical conductivity is produced using a tin oxide powder having a particle size so small that it does not hamper transparency.

U.S. Pat. No. 5,307,233 describes how small flakes can be prepared from polyvinyl chloride by continuous extrusion and by cutting these parts, coated with an electrically conductive covering, into bits. The bits are subsequently mixed with a PVC material, and the mix thus obtained is used for manufacturing, for example, floor coverings.

PVC is at present a non-recommended material, and therefore it is desirable to avoid its use in all surfacings. In case of fire, PVC releases chlorine, which forms with water hydrochloric acid, which is highly detrimental owing to its corrosive action.

U.S. Pat. No. 5,728,476 (Amtico Company Limited) discloses how from an ionomer and a polyfunctional olefin compound a clear surface layer highly resistant to wear is obtained for a resilient floor covering. The ionomer is crosslinked by means of the polyfunctional compound. This structure in itself is not electrically conductive.

U.S. Pat. No. 4,083,824 (Armstrong Cork Company) describes how from at least two alkylacrylate polymers and an ionomer a covering free of polyvinyl chloride is obtained by using mineral fillers. This structure in itself is not electrically conductive.

U.S. Pat. No. 5,616,418 (Atochem) describes a multilayer film that contains a block polyether amide. The structure according to the known option is not, however, electrically conductive. The publication contains no mention of the effect of the metal salts used as optional components on the electrical conductivity of the material.

U.S. Pat. No. 5,652,326 (Sanyo Chemical Industries, Ltd.) describes how an electrically conductive plastic is obtained from polyetherester amide and an alkali metal when 0.01–2.00 molar per cent of an alkali metal halide or an alkaline-earth metal halide is introduced into the mixture. No differentiation is made between monovalent and bivalent ions with respect to electrical conductivity. According to the known option, sulfone groups grafted into it bind the alkali cations. Carboxylic acid groups are discussed in the description, but in the examples they are always esterified. According to the examples, the recommended amount of metal salt is up to 5–30 molar per cent of the material being produced. Halogens cause problems in some practical applications.

U.S. Pat. No. 5,059,474 (Nitto Boseki Co.) relates to a multilayer floor covering wherein the surface layer is prepared from softened polyvinyl chloride. The structure is not electrically conductive.

JP application publication 58015554 (Toray Industries) discloses a blend of a strong polyetherester amide and an ionomer, resistant to heat and cold. The metal ion in the ionomer is mentioned as being (I)–(III)-valent. There is no mention of the electrical conductivity of the blend, and no distinction is made among different metal ions.

The object of the present invention is to eliminate the disadvantages associated with the prior known options and to provide a covering material of an entirely novel type.

The present invention is based on the idea that the covering structure is made of two adjacent layers, of which the first—in the case of a floor covering the "upper one"—is formed from an electrically conductive ionomeric polyelectrolyte (IPE) and possibly fillers. The electrically conductive ionomeric polyelectrolyte is of the type described in patent application PCT/FI02/00559, the contents of which are incorporated into the present application by reference. This ionic polymer is in general characterized in that it is made up of at least two separate polymers, one of them binding monovalent cations with the help of carboxylic acids in the polymer chain.

In addition to the first layer made up of IPE the structure has at least one other layer, which has been rendered electrically conductive by means of, for example, carbon black, graphite or carbon fiber. The first layer and the second layer are in electrical contact with each other, which means that they may be directly one against the other, or they are interconnected by means of a material layer that does not act as an insulator.

More precisely, the option according to the invention is characterized in that the first layer contains a wear-resistant and electrically conductive ionomer polyelectrolyte, and the second layer is electrically conductive.

The invention provides considerable advantages. Thus, by means of the invention there is obtained an electrically conductive, dyable and wear-resistant structure, in particular a covering structure such as floor covering or wall covering, tile or mat or the like. Air humidity and temperature do not have major effect on the electrical conductivity of the covering material, as they do in the case of materials containing, for example, antistatic compounds. The color of the covering according to the invention can be selected freely. It is preferably also devoid of halogens, which means that it will not produce toxic and harmful gases in case of fire.

The other advantages and characteristics of the invention are evident from the following detailed description.

As was noted above, the covering material according to the invention contains at least two layers, of which the first layer contains as the electrically conductive component an ionomeric polymer made up of at least two different polymers, of which at least one binds monovalent cations by means of carboxylic acid groups grafted into the polymer chain. The second layer is an electrically conductive layer with which the first layer is in electrical contact.

Typically the first layer discharges the voltage, for which reason its resistance is in the order of 1–100 Mohm (surface-surface, 100 V). The resistance of the second, electrically conductive layer for its part is approx. two decades smaller, i.e. approx. 0.01–0.2 Mohm. The surface resistance of the sheet is $\leq$100 Mohm (preferably less than 100 Mohm) measured according to Standard ASTM D-257.

The electrically conductive polymer component in the first layer is in one embodiment made up of at least two different polymers, of which one contains carboxylic acid groups and the other ether bonds, and of at least one alkali metal cation. According to the invention at least some of the ether groups hold by means of a polar charge a monovalent cation, which is Li, Na, K, Cs or Rb, or a mixture thereof. The cation is highly preferably K. This and other cations (also the alkaline-earth ions mentioned below) and similar compounds of bivalent cations can be introduced into the blend as hydroxides, oxides, formates, carbonates, acetates or mixtures thereof. In the polymer blend, some of the carboxylic acid groups are also ionized.

Among, for example, the copolymer of ethylene and methacrylic acid (E/MAA) and the polyether block amide (PEBA) and the alkali metal cation it is possible to build a polymeric system wherein an IPN (InterPenetrated Network) structure of PEBA is formed inside the E/MAA phase. In the material, some of the cations crosslink the methacrylic acid groups in the E/MAA. Thus there are formed thermally reversible ion bonds that improve the mechanical properties of the polymer. Some of the cations bond to the oxygen pools of the polyether and produce, for example by means of segmental movement of the polymer chains, ionic electrical conductivity. Instead of PEBA it is possible to use, for example, a block polymer of polyester and polyether, or a block polymer of polyurethane and polyether. The polyether is such that it is capable of solvating ions.

The ionomer can be called polymer component A and the block polyether polymer B. Polymers A and B are present in the mixture at weight ratios A/B 90/10–10/90, preferably 85/15–20/80.

Ionomers are known for, for example, their brightness and good mechanical properties. Generally ionomers are copolymers of alpha- or beta-unsaturated carboxylic acid and ethylene and are partly crosslinked with I-or II-valent cations. Ethylene ionomers are typically good insulators, and their surface resistances are of the order of $10^{16}$–$10^{18}$ ohm (10exp16–10exp18).

According to the invention, the ionomer component of the polymer blend can be prepared, for example, from copolymers or terpolymers of ethylene and alpha- or beta-unsaturated carboxylic acids, the copolymers or terpolymers containing, in addition to the above-mentioned mers, esters of alpha- or beta-unsaturated carboxylic acids. The carboxylic acid in general has 3–8 carbon atoms. Typically the polymer has, in parts by mass, acrylic or methacrylic acid 4–24 parts, methyl-, ethyl, or butylacrylate or vinyl acetate 0–40 parts, the balance being ethylene in 100 parts of the polymer. Commercially available co- and terpolymers according to the invention include Basel's Lucalen, Du Pont's Nucrel, Bynel and Surlyn or Exxon Chemicals's Iotek-named ionomers and their non-neutralized precursors.

The polyether block may be located in the copolymer of the polyamide or polyester or polyurethane. The polyether block may be composed of polyethylene or polypropylene glycols (polyethylene oxide or polypropylene oxide), copolymers/blend polymers of these, poly(1,2-butyl glycol), or poly(tetramethyl glycol). Typically the mass proportion of polyether in the copolymer is 20–90 parts of 100 parts. Most preferably it is 50–90 parts of 100 parts. A low ether concentration weakens electrical conductivity. Commercially available polymers that contain a polyether block include Hytrel (Du Pont) and Pebax (Atofina). The surface resistances of these polymers range from $3^8$ to $4^{13}$ ohm.

An example of a preferable polyether block of polymer B is polyethylene oxide having a molecular weight within the range 300–20,000.

The cation content in the polymer blend is 0.04–2.5 millimols/gram of the polymer blend and the alkali cation content is 0.4–1.7 millimols/gram of the polymer blend.

The ionomer in the surface layer may in general contain 0.1–3% by weight of an alkali metal cation and 0–2% by weight of an alkaline-earth metal cation, and 0–1% by weight of one or more of the following: zinc, magnesium and aluminum. The cations may be introduced into the ionomer in the form of hydroxide, silicate, formate, acetate, carbonate or oxide, e.g. potassium hydroxide or potassium silicate. Also other cation sources can be used.

The good mechanical properties of ionomers enable the material to be used in the wear layers of the floor coverings and similar covering materials according to the present invention. Ionomers are very tough, and any scratches on their surface can be repaired simply by using a hot-air blower or, for example, a hot flat iron and siliconized paper. A comparison with PVC plastic shows that in the course of time the properties of PVC plastic become, primarily owing to the evaporation of softeners, brittle and hard. In ionomers, instead, as a consequence of their long useful life, the properties remain unchanged for a long time, which is especially important in covering material applications.

The first layer may be substantially completely transparent and electrically conductive.

The polymer used in the electrically conductive second layer, i.e. the bottom or support layer, is typically a halogen-free polymer, such as a polyolefin elastomer. Even other elastomers are usable. Polypropylene elastomers, polyethylene elastomers, ethylene-methacrylic acid butyl acrylate terpolymers and polyurethane elastomers can be mentioned as generic examples. Commercial products that can be mentioned include Montell's Adflex Q100F and Lucobit's Lucopren 1721 TPE/PP polymer. Electrically conductive particles are used typically in an amount of 10–200%, preferably approx. 15–80% by weight, of the mass of the polymer phase. These fillers may be, for example, carbon black, ground anthracite, ground graphite, carbon fibers, and mixtures thereof. Various metal powders also work well.

The first and second layers may be in direct contact with each other, in which case the structure can be prepared by producing the polymer films by means of, for example, extrusion or a roll mixer, and by laminating the layers together by using heat and pressure. The extrusion of the first layer can be carried out at a temperature of 110–330° C. The ionomer is typically an adhesion polymer, and good lamination is achieved at relatively low temperatures, such as 110–250° C. The pressures depend on the temperature and the time, but at a pressure as low as 10 bar, generally approx. 10–25 bar, it is possible to produce a laminate according to the invention.

The thickness of the first layer is in general approx. 0.05–2 mm, preferably approx. 0.08–1 mm, especially preferably approx. 0.1–0.8 mm. The thickness of the second layer is in general approx. 0.08–3 mm, preferably approx. 0.1–2 mm, especially preferably approx. 0.2–1.5 mm. The thickness of the first layer and the second layer together is approx. 0.5–4 mm.

It is possible to add to the surface layer, for example, quartz or feldspar powder to increase resistance to wear. It is also possible to use other fillers (finely divided silica, aluminum oxide). The IPE used in the structure according to the invention seems to bind different fillers to the polymer matrix substantially better than, for example, PVC is capable of binding. For this reason a covering such as this is substantially more resistant to wear than are conventional covering materials.

It is possible to blend in the surface layer some other polymer, such as a polyolefin (polypropylene, polyethylene) to modify the properties of the surface layer and to reduce the raw material costs. The compatibility window of IPE is, however, quite wide, and in addition to the said polymers it is also possible to blend with the ionomeric polymer, for example, polyamide, polystyrene or polyester in order to increase stiffness and/or hardness.

To strengthen the bond between the filler and the polymer matrix, the filler can be preferably treated with tetraethoxysilicate, which gradually hydrolyzes to silica gel under the effect of moisture and binds the polymer and quartz sand well together. This hydrolyzation is rapid especially when the mix contains alkalinity as does IPE.

The described structure advantageously allows fluorescent chemicals and/or pigments as well as phosphorescent pigments, the luminescence of which remains for minutes after lights are turned off, to be added to the surface layer. Such a covering can be used for marking emergency exits.

As the surface layer of the electrically conductive covering according to the present invention is clearly anionic in character, it can especially advantageously be waxed with a cationic wax, and thereby good adhesion is attained.

According to one preferred embodiment, the electrically conductive and wear-resistant structure, especially a covering structure such as a floor tile or mat or the like, which is made up of at least two layers, contains a surface layer made up of an ionomer treated with a wear-improving filler, the ionomer being a polymer of a co- or terpolymer of ethylene and acrylic or methacrylic acid, or any other known ionomer, and a block polyether, the polymer being ionically crosslinked with alkali and/or alkaline-earth and/or metal cations, in which ionomer the ratio of the ionomer to the filler is within the range or 10–90:90–10, and the bottom layer is made up of at least one halogen-free elastomer. In this case, at least one filler in the bottom layer is carbon black, ground anthracite or ground graphite.

The advantage of the structure according to the invention is that its electrical conductivity can be regulated with precision, and thus it is possible always to reach the optimal ESD shielding range, i.e. a surface resistivity range of $10^6$–$10^9$ ohm.

Between the first layer and the second layer there may also be a third layer, a so-called middle layer, which is made up of a polymer film that has been rendered electrically conductive by means of pigments or polymer blends known per se. If the ionomer layer is made transparent, it is possible to print patterns, texts, wood grain imitations and colorings on the middle layer, according to need. The patterning or other design is in this case visible through the surface layer and thus gives the floor or other surface the desired outer appearance. The thickness of the middle layer is in general 0.05–1 mm, preferably approx. 0.08–0.5 mm, preferably approx. 0.1 mm, and the concentration of conductive particles is usually approx. 5–50% by weight of the layer, typically less than 30% by weight. The third layer is in general thinner than the first and second layers.

The three-layered structure can also be prepared by producing the layers separately (in particular the first, transparent layer is produced by extrusion or roll mixer in the manner described above), whereafter they are pressed together at a temperature of, for example, 150–180° C., whereby there is produced a layer structure the electrical conductivity of which is after 14 days (at a relative humidity of 50% and a temperature of 23° C.) less than 30 Mohm according to Standard IEC 61340-4-1.

According to another preferred embodiment of the invention there is thus produced an electrically conductive multilayer structure, in particular a covering structure, such as tile- or mat-form floor covering, which is made up of at least three layers, of which the top layer is transparent and is made up of an ionomer that is a polymer of a co- or terpolymer of ethylene and acrylic or methacrylic acid, or any other known ionomer, and a block polyether, the polymer being ionically crosslinked with alkali and/or alkaline-earth and/or metal cations. The middle layer is made up of an electrically conductive layer of a polymer known per se, the layer having been rendered at least partly opaque with fillers or pigments. The bottom layer is made up of a polypropylene elastomer or a corresponding elastomer, rendered electrically conductive with carbon-containing particles and/or fibers or other known electrically conductive particles.

Between the first layer and the second layer there may be also a middle layer of another kind, which is intended for dimensional stabilization and is prepared from, for example, glass fibers or carbon fibers, or a combination thereof. The layer may be net-like. In uses in which the middle layer may be grounded and the middle layer contains carbon fiber, the bottom layer may be, with respect to gluing, of any known material but not PVC, for the reasons described above. When the stabilizing layer contains carbon fiber in an amount making grounding possible, the lower polymer layer may, when so desired, be electrically non-conductive. If, on the other hand, the bottom layer is electrically conductive, the dimensional stabilization layer may be a glass fiber weave or a joint fabric of glass fiber and carbon fiber or a non-woven material, in which case the top layer and the bottom layer (first and second layers) can be pressed together through the net. The dimensionally stable material may also be of ceramic fiber or polyester or polyamide, or a mixture thereof, or a mixture of these or any of those mentioned above.

The middle layer stabilizes thermal and hygro-instability, and its thickness is, for example, 0.1 mm. It may contain, for example, 15% carbon fiber.

An electrically conductive middle layer is preferable especially in cases in which it is not desirable to add electrically conductive particles, such as carbon black or carbon, to the bottom layer. These applications include floor coverings for clean rooms and desk pads.

According to a third preferred embodiment of the invention, the electrically conductive and dimensionally stable covering structure comprises two polymer layers, of which at least the top one is electrically conductive and made up of an ionomer that is a polymer of a co- or terpolymer of ethylene and acrylic or methacrylic acid, or any other known ionomer, and a block polyether, the polymer being ionically crosslinked with alkali and/or alkaline-earth and/or metal cations, there being between the polymer layers a material dimensionally stable against changes caused by moisture and temperature.

In this third material the layer called the "second" above is below the layer called the "third", and the said "third layer" is or may be electrically conductive, in which case the "second" layer need not be so. It is essential in terms of the invention that the first, ionomer-containing layer is in electrical contact with at least one other layer that is electrically conductive.

The structure according to the present invention is typically in the form of a tile or a mat. It can be used for purposes mentioned in the preamble of the specification, in particular for covering floors, walls and various flat surfaces. The invention is especially well usable for ESD shield applications.

The invention is described below with the help of examples.

Acronyms Used
  MAA, methacrylic acid
  BA, butyl acrylate
  E, ethylene
  PEG, polyethylene glycol

EXAMPLE 1

A single-colored, white, elastic two-layer covering is prepared, wherein the approximately 0.6 mm thick top layer consists of the following components:

Top Layer
  70 parts of an E/BA/MAA terpolymer, in which MAA 10 molar % and BA 20 molar %
  30 parts of a block polymer of polyamide or polyester and PEG
  200 parts of $CaCO_3$; particle size <100 μm
  10 parts of titanium oxide
  2.0 parts of KOH
  0.2 parts of Zn acetate The bottom layer, having a thickness of 1.3 mm, was prepared from the following components:

Bottom Layer
  60 parts of a polyolefin elastomer, Adflex Q100F
  40 parts of an E/BA/MAA terpolymer
  300 parts of calcium carbonate, ground
  100 parts of carbon black
  1.0 parts of magnesium oxide Both of the layers were prepared in a roll mixer at a temperature of 160° C., and were laminated together in a static press further at a temperature of 160° C.

Electrical conductivity was measured at 14 days from manufacture (humidity 30% RH), and it yielded a value of less than 20 Mohm, according to Standard IEC 61340-4-1. The surface resistance of the sheet was <100 Mohm, measured according to Standard ASTM D-257.

According to the targeted use, the filling factors of the layers may vary within the range 10–90 molar %.

EXAMPLE 2

A two-layer mat especially well suited for covering shelves was prepared. The materials of both layers were prepared by extrusion, and sheets were pressed at 170° C. from the bands obtained and were further laminated together at 120° C.

Top Layer
  55 parts of E/MAA, MAA 9 molar %
  15 parts of E/BA/MAA, MAA 10 molar % and BA 10 molar %
  30 parts of polyether-ester amide, PEG 50 molar % and polyamide-12 50 molar %
  2.0 parts of $TiO_2$
  2.2 parts of KOH
  0.2 parts of MgO Bottom Layer
  100 parts of EVA, VA 16 molar %
  20 parts of carbon black The thickness of the top layer of the composite was 0.2 mm and that of the bottom layer was 0.8 mm. The surface-surface resistivity measured for the mat was 15 Mohm according to Standard IEC 61340-4-1 at 14 days from manufacture, air humidity was 40 RH.

EXAMPLE 3

A two-layer tile especially well resistant to wear was prepared. The materials of both layers were prepared by extrusion, and from the bands obtained there were pressed sheets, which were further laminated together.

Top Layer
  65 parts of E/BA/MAA, MAA 10 molar %, BA 10 molar %
  35 parts of polyether-ester amide, PEG 50 molar % and polyamide-12 50 molar %
  250 parts of quartz sand, particle size less than 300 μm
  10.0 parts of $TiO_2$
  2.0 parts of KOH
  0.4 parts of MgO Bottom Layer
  100 parts of EVA, VA 28 molar %
  300 parts of $CaCO_3$ powder
  80 parts of carbon black The thickness of the top layer of the composite was 0.6 mm, and the thickness of the bottom layer was 0.6 mm. The surface-surface resistivity measured for the tile was 15 Mohm according to Standard IEC 61340-4-1 at 14 days from manufacture, air humidity was 40 RH.

EXAMPLE 4

A two-layer mat having an especially attractive outer appearance and being suited for covering was prepared. The top layer had in its embodiment excellent optical properties, and the electrical conductivity of the second layer was produced by means of conductive titanium oxide. In this case it is possible to print multi-colored patterns on the surface of the white lower layer. The materials of both layers were produced by extrusion, and from the bands obtained there were pressed sheets, which were further laminated together.

Top Layer
  65 parts of E/BA/MAA, MAA 10 molar % and BA 10 molar %
  35 parts of polyetherester amide, PEG 50 molar % and polyamide 50 molar %
  2.2 parts of KOH
  0.2 parts of MgO Bottom Layer
  100 parts of EVA, VA 16 molar %
  50 parts of electrically conductive titanium oxide The thickness of the top layer of the composite was 0.4 mm and that of the bottom layer was 0.6 mm. The surface-surface resistivity measured for the mat was 11 Mohm at 14 days from manufacture, air humidity was 40 RH.

The invention is described above with examples. It is, however, clear that the material thicknesses are by way of example and may vary depending on the covering material used.

EXAMPLE 5

An elastic three-layer mat was prepared, wherein the 0.5 mm thick top layer was composed of a dissipative plastic filled with feldspar, and the 1.5 mm thick bottom layer of a polyolefin elastomer having ground calcium carbonate as the filler. Between the layers there was an electrically conductive glass fiber/carbon fiber net.

Top Layer
  60 parts of E/BA/MAA, where BA=10 molar %, MAA=10 molar %
  40 parts of polyether amide, where ether=PEG 40 molar %, amide=copolyamide 6 and 6.6 60 molar %
  1 part of MgO
  1.5 parts of KOH
  200 parts of feldspar; particle size <100 μm Bottom Layer
  100 parts of a TPE/PP polypropylene elastomer
  60 parts of ground calcium carbonate The top layer was prepared by extruding the components, except for the feldspar, at 220° C. A strong increase in the melt viscosity of the plastic indicated the formation of ion bonds. The feldspar was mixed with the prepared plastic by means of a roll mixer at 130° C.

The components of the bottom layer were mixed in an extruder at 220° C. The surface-surface resistance measured for the structure laminated together was 30 Mohm at 14 days from manufacture, at a humidity of 40% RH.

The invention claimed is:

1. A covering material comprising
   a first layer, which forms the wearing layer of the structure and contains an ionomer, and
   a second layer, next to the first layer,
   wherein
   the first layer contains said ionomer which is a wear-resistant and an electrically conductive ionomer polyelectrolyte,
   said ionomer is a polymer blend of a co- or terpolymer of ethylene and acrylic or methacrylic acid, and a block polyether, the polymer blend being ionically crosslinked with alkali and/or alkaline-earth and/or metal cations, and
   the second layer is electrically conductive.

2. The covering material according to claim 1, wherein the second layer forms the bottom layer of the structure and is made up of a polyolefin elastomer that has been rendered electrically conductive.

3. The covering material according to claim 2, wherein the second layer contains anthracite, graphite, carbon fiber, carbon black or an electrically conductive polymer.

4. The covering material according to claim 1, wherein next to the first layer, in electrical contact therewith, there is the second layer, which comprises a net prepared from an electrically conductive material, the net at the same time reducing the thermal and hygro-instability of the electrically conductive material.

5. The covering material according to claim 1, wherein the first layer is at least substantially transparent and that between the first layer and the second layer there is a middle layer, which is patterned, printed, colored or otherwise treated so that it has a pattern that is visible through the top layer and gives the covering the desired outer appearance.

6. The covering material according to claim 1, wherein the first layer contains a substance improving its resistance to wear, the substance comprising quartz powder, feldspar powder, finely-divided silica or aluminum oxide.

7. The covering material according to claim 1, wherein in the ionomer of the first layer the cation content is 0.04–2.5 millimols/gram of the polymer blend and the alkali cation content is 0.4–1.7 millimols/gram of the polymer blend.

8. The covering material according to claim 1, wherein the resistance of the first layer is about 1–100 Mohm.

9. The covering material according to claim 1, wherein the resistance of the conductive layer next to the first layer is approx. 0.01–0.02 Mohm.

10. The covering material according to claim 1, wherein the first layer contains
    A) a polymer of an olefin and an unsaturated carboxylic acid, wherein the quantity of acid groups is 0.5–15 molar %, and B) a block polyether polymer composed of a polyether block and a polyamide or polyester block, in which case the acid groups in polymer A and the polyether blocks in polymer B have at least partly coordinated alkali ions, and an alkali metal is present in an amount of about 0.02–3 millimols/gram of the polymer blend.

11. The covering material according to claim 10, wherein block polyether B contains polypropylene oxide, polyethylene oxide or a compound polymer of these, block polymer B having at least partly coordinated or complexed the said alkali metal.

12. The covering material according to claim 10, wherein the olefin in polymer A is ethylene or propylene.

13. The covering material according to claim 10, wherein in polymer B the polyether block is polyethylene oxide having a molecular weight within the range 300–20,000.

* * * * *